QUADRUPLE MODULATION RECORDING SYSTEM

Filed Jan. 4, 1968 2 Sheets-Sheet 1

INVENTORS
NOBORU KIMURA
PAT E. EVANS
BY
THEIR ATTORNEYS

QUADRUPLE MODULATION RECORDING SYSTEM

Filed Jan. 4, 1968 2 Sheets-Sheet 2

INVENTORS
NOBORU KIMURA
PAT E. EVANS

Louis A Kline
BY John J. Matlago
Richard J. Rengel
THEIR ATTORNEYS

United States Patent Office 3,518,700

Patented June 30, 1970

3,518,700

QUADRUPLE MODULATION RECORDING SYSTEM

Noboru Kimura, Gardena, and Pat E. Evans, Torrance, Calif., assignors to The National Cash Register Company, Dayton, Ohio, a corporation of Maryland Filed Jan. 4, 1968, Ser. No. 695,652

Int. Cl. G11b *5/02, 5/04*

U.S. Cl. 346—74 7 Claims

ABSTRACT OF THE DISCLOSURE

A recording system is provided in which binary signals are converted to a coded signal for providing a self-clocked record signal having a low-frequency component within the wavelength resolution characteristics of a magnetic record medium and containing both the data and clock-timing signals; and a high-frequency quadruple modulation component which is beyond the resolution characteristics of the magnetic record medium. The coded signals are formed individually for each binary digit by a logical circuit selectively gating high- and low-frequency signals according to the binary bit pattern including both prior and subsequent digits in a series of digits. The low-frequency component of the record signal contains the data, and the quadruple modulation is effective to control the magnetization excursions in the record medium to produce uniform amplitude variations of the magnetically recorded signal to prevent peak-shift in the reproduction thereof.

SUMMARY

The recording system of the present invention provides a high-density storage system capable of operating at high-transfer rates. More particularly, the present system provides for increasing the bit storage density on a record medium and also the data transfer rate over present digital recording systems of the self-clocked type.

According to the system of the present invention, the number of flux changes per length of record medium is reduced by at least one-half from "Manchester" or "Double-Frequency" recording systems by recording data signal having no more than one flux change in a bit cell. Further, the reproduction of the recorded signal from the record medium is substantially improved by elimination of peak-shifting of the reproduced signal. The improvement in reproduction of the recorded signal results from coding of the digital data wherein the data signal is modulated by insertion of a high-frequency signal according to the digital pattern, i.e., low-frequency flux transitions representing the digital data are modified during recording on the tape to limit changes in magnetization beyond predetermined bipolar magnetization levels. The high-frequency modulation is beyond the wavelength resolution of the record medium to avoid magnetic recording of the high-frequency, but within the capability of the record head to produce high-frequency flux transitions for erasing any previous recording on the record medium.

An object of the present invention, therefore, is to provide a recording system having any one or all of the foregoing features and advantages.

Additional features and advantages of the invention will become apparent to those skilled in the art as the disclosure is made in the following detailed description of a preferred embodiment of the invention as illustrated in the accompanying sheets of drawing in which.

Figure 1:
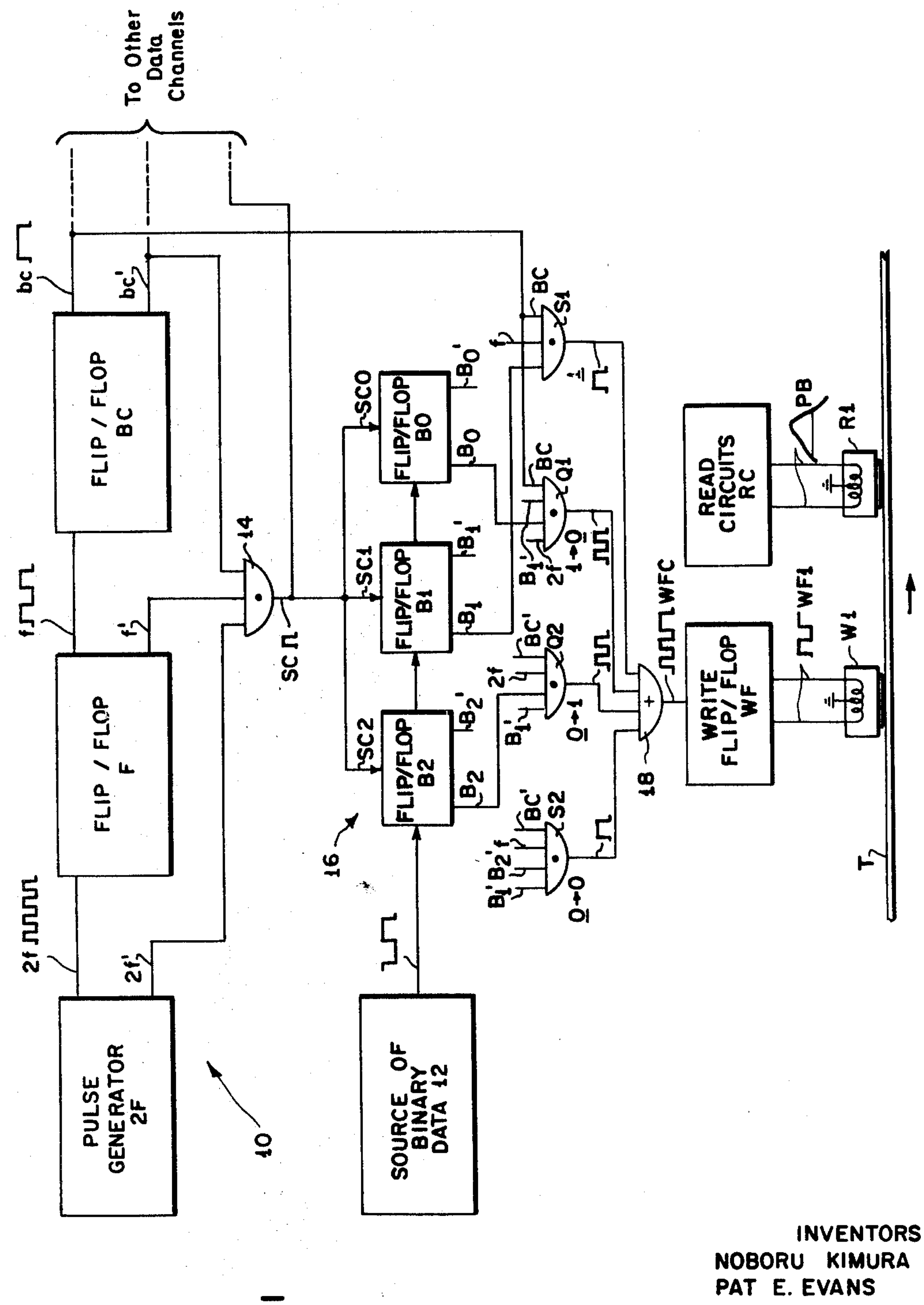
FIG. 1 is a schematic circuit diagram, partly in block form, of the preferred embodiment of the recording system of the present invention.

Referring to FIG. 1, the preferred embodiment of the recording system of the present invention is shown by a block diagram including timing control circuits 10 for supplying timing pulses to parallel data channels, and logical circuitry including data register 16 provided for a typical one of the data channels which is shown coupled to its respective source of binary data 12.

Figure 2:
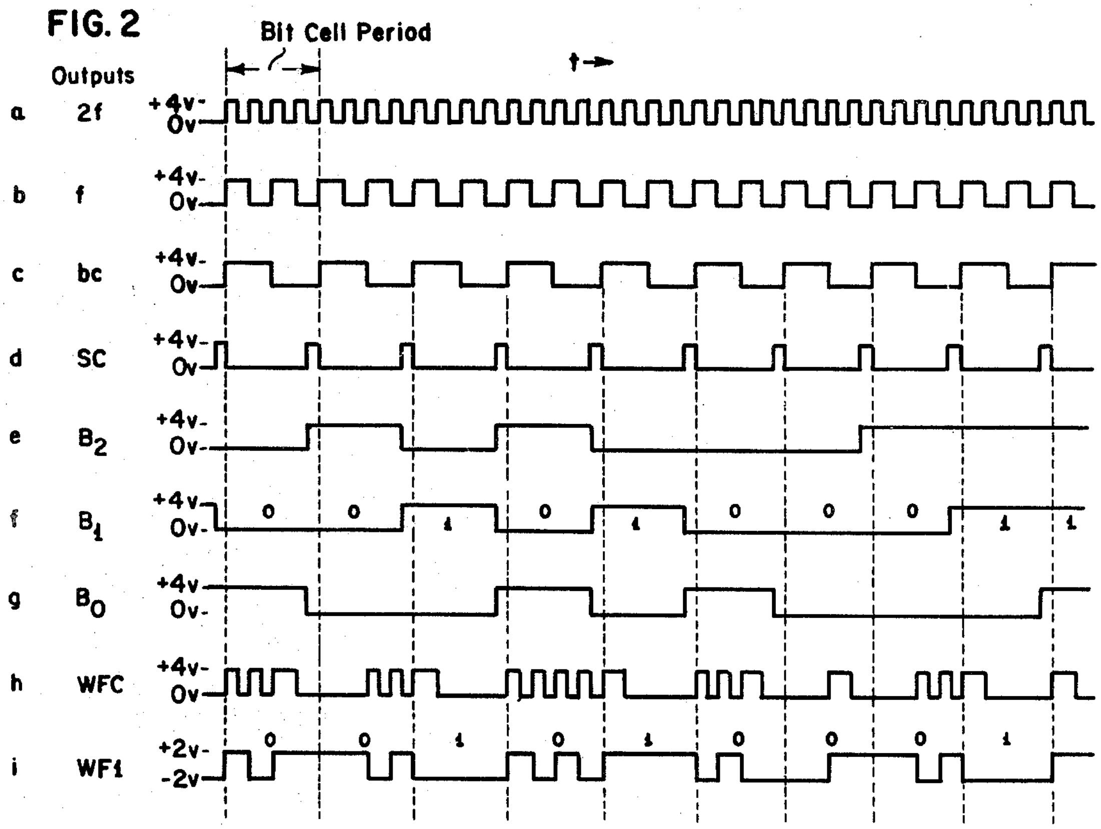
FIGS. 2 and 3 are timing diagrams including illustrative signal waveforms produced during the operation of the present invention for demonstrating exemplary recording of various sequences of binary digits.

The timing control circuits 10, including pulse generator 2F and flip/flops F and BC, have prime outputs *2f′f′* and *bc′*, respectively, which are coupled to an AND gate 14 to produce timing control pulses SC (FIG. 2*d*). Timing control pulses SC are coupled to individual timing or clock inputs SC2, SC1, and SC0 of flip-flops B2. B1 and B0 comprising the data register 16. As shown by the signal waveforms in FIGS. 2*e*, 2*f* and 2*g*, the binary data supplied serial-by-bit from source 12 to flip/flop B2 of the data register 16 is shifted to flip/flops B1 and B0 during the time interval of each timing pulse SC. The true and false outputs $B_2$, $B_2'$; $B_1$, $B_1'$ and $B_0$ and $B_0'$ of flip/flops B2, B1 and B0, respectively, are coupled to AND gates Q1, Q2, S1 and S2, as shown in FIG. 1, to pass timing signals to OR gate 18 which provides an output signal WFC in response thereto. The output signal WFC is coupled to the input of write flip/flop WF to produce a record signal WF1 which is coded in accordance with the different configurations of the bit pattern of data stored in flip/flops B2, B1 and B0 of the data register 16. Of course, the only data bit being coded for recording in any particular bit cell period is the bit stored in flip/flop B1, but the coding of the record signal WF1 (FIG. 2*i*) for the bit stored in flip/flop B1 is dependent, in most instances, upon the sequence of bits including the preceding bit (stored in flip/flop B0) and the following bit (stored in flip/flop B2) which is more fully described infra.

Figure 3:
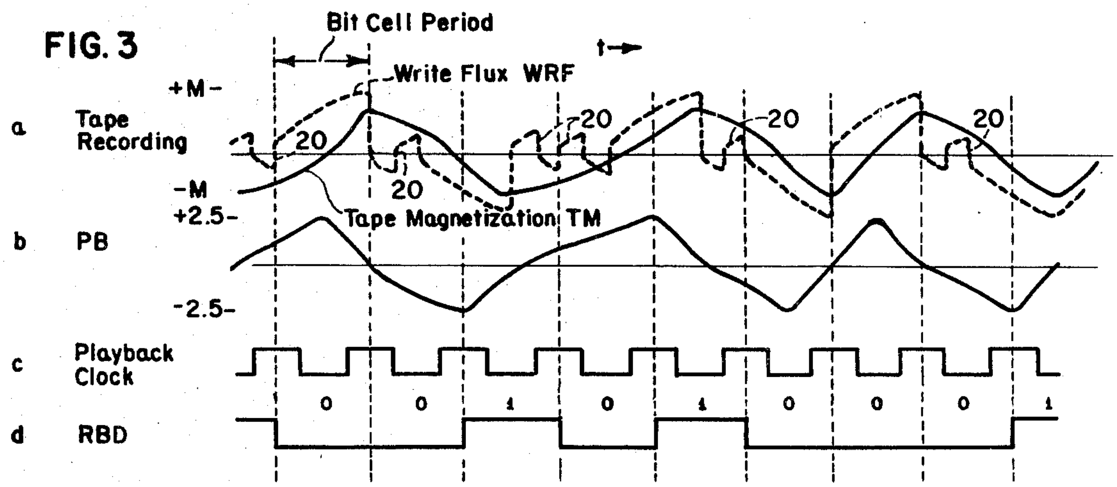

The coded record signal WF1 is coupled from the output of write flip/flop WF to the write head W1, as shown in FIG. 1, to produce a write flux WRF (initial tape magnetization) and tape magnetization TM of the recorded signal of the data, shown by waveforms in FIG. 3*a*. It should be noted that the tape magnetization TM (magnetically recorded data on tape T) is substantially different than the write flux WRF (FIG. 3*a*) due to the lack of high-frequency response (or wavelength resolution) of the magnetic recording medium of tape T, e.g., magnetic oxide and binders on the tape substrate or backing. For example, a magnetic oxide tape capable of recording 3,000 flux reversals per inch which has an upper limit of 6,000 flux reversals per inch will not record high-frequency flux reversals of 12,000 flux reversals per inch produced by quadruple modulation, and the latter high-frequency flux reversals will be effective to erase any previous recording or magnetization on tape T. The erasure of any previous recording or magnetization is important in providing a continuous recording of the current data from source 12 and therefore, the record head W1 should be capable of responding to the high-frequency modulation component of the coded signal WF1 (FIG. 2*h*) to produce the high-frequency flux reversals in the magnetic medium of the tape T as indicated, for example, by the reference numeral 20 in FIG. 3*a*.

The data magnetically recorded on the magnetic tape T (FIG. 1) and shown by the waveform of the tape magnetization TM in FIG. 3*a* is reproduced by the read head R1 to produce a playback voltage signal waveform PB shown in FIG. 3*b*. The playback signal PB is coupled to the read circuits RC wherein the signal PB is amplified and signal peaks are detected to provide playback clock pulses (FIG. 3*c*) for reproducing the data in binary form as shown in FIG. 3*d*.

Referring again to FIG. 1 for a more detailed description of the logical circuitry for coding of the data, it should first be recalled that flip/flop B1 stores the data bit being coded for writing on the tape T and flip/flops B2 and B0 store adjacent bits of serial data. It should now be observed that only gate S1 passes any timing output signal whenever a "1" bit is being coded for recording, and further, gate S1 passes the timing output *f* only during the first half of the bit cell period. This coding for a "1" bit provides for a change in binary voltage level of the record signal WF1 at the beginning of the bit cell period only and no change in voltage level is produced during the remainder of the respective bit cell period in order to assure an effective flux transition (a fast change in magnetization on tape T) during the bit cell period storing a "1" bit as shown in FIG. 3*a*. An expected signal delay is produced during recording on the tape T and playback of one-half of a bit cell period which is evident from a comparison of the waveform of data in FIGS. 2*f* and 3*d*. This is mentioned here only to clarify the shift in timing of the bit cell period of the data according to the voltage peaks of the playback signal PB (FIG. 3*b*) and reproduced binary data signal shown in FIG. 3*d*.

Continuing the detailed description of the logical circuitry for coding data, the remaining gates Q1, Q2 and S2 are provided for coding the signal to be recorded for a "0" bit and more particularly, gate S2 provides for coding to assure an effective flux transition in the middle of a bit cell period whenever a "0" bit (stored in flip/flop B1) is being coded and the following bit (stored in flip/flop B2) is a "0" bit. Gate S1, therefore, assures that at least one effective flux transition will occur each bit cell period whenever this sequence of "0" bits occurs to produce the record signal WF1 which is self-clocking. The remaining gates Q1 and Q2 are provided for quadruple modulation of the record signal in "0" bit cell periods to avoid peak-shifting in the playback signal which would otherwise be produced as a result of undesirable amplitude variations of magnetization and flux fields on the tape T. In high density recordings, the magnetization will vary in amplitude if the spacing between signal level changes varies within the wavelength resolution of the magnetic medium and is not compensated for in the recording operation. According to the present invention, quadruple modulation avoids any effective variation in spacing of the magnetically recorded signal. However (in the absence of quadruple modulation), the spacing of signal level changes between adjacent "1," "0" and "0" (in that order) bits will be one and one-half (1½) times the spacing of successive "1" bits or successive "0" bits; the spacing of signal level changes between adjacent "0," "0" and "1" bits (in that order) will also be one and one-half (1½) times the spacing of successive "1" bits or successive "0" bits; and the spacing of signal level changes between adjacent "1," "0" and "1" (bits in that order) will be twice (2) the spacing of successive "1" bits or successive "0" bits.

The present invention, by means of gates Q1, Q2 and S2, avoids the foregoing problems by prevention of unequal amplitude variations of tape magnetization TM, which would otherwise result because of the actual unequal spacing between signal level transitions of adjacent "0" and "1" bits of the record signal WF1, by coding which produces quadruple modulation in the "0" bit cell periods by means of quadruple modulation gates Q1 and Q2 which pass the timing signal 2*f* (FIG. 2*a*) to produce quadruple modulation during first and second halves of the "0" bit cell period, respectively. Thus, gate Q1 passes the timing signal 2*f* for coding to quadruple modulate the record signal WF1 (FIG. 2*i*) during the first half of the bit cell period for a "0" bit after a "1" bit (1→0̲) to effectively limit the spacing between flux transitions to the low-frequency of the bit cell time period, i.e., the modulation at the beginning of the "0" bit cell is spaced one bit cell period from the "1" bit flux transition at the beginning of the "1" bit cell. Gate Q2, on the other hand, passes the timing signal 2*f* for coding to quadruple modulate the record signal during the last half of the "0" bit cell period to introduce modulation to prevent one-half bit cell period spacing of effective flux transitions for the "0" bit (in the middle of the cell) and the "1" bit (0̲→1) at the beginning of the "1" bit cell. The quadruple moduation resulting from the coding by gate Q2 eliminates effective flux transition for the "0" bit cell. The combination of gates Q1 and Q2 both passing the timing signal 2*f* for coding, quadruple modulates the record signal during the entire bit cell period whenever a "0" bit occurs between "1" bits.

The remaining gate S2 passes the timing signal *f* during the last half of a "0" bit cell period whenever the following bit is also a "0" bit to produce a change in signal level to assure effective low-frequency flux transitions during a series of at least two "0" bits, i.e., an effective flux transition spaced by no greater than a bit cell period.

The coding produced by gates S1, S2, Q1 and Q2 is illustrated for the various "0" and "1" bit combinations in FIG. 2*h* by the coded signal WFC and the quadruple modulated record signal WF1 (FIG. 2*i*) is produced at the output of flip/flop WF. As noted earlier in the description, the record signal WF1 is coupled to the record head W1 to produce initial tape magnetization shown by the dashed line in FIG. 3*a* including quadruple modulated flux transitions 20 that are effective to maintain uniform tape magnetization of digital data. Due to self-demagnetization of the quadruple modulated flux transitions, resultant tape magnetizations TM correspond to the digital data and is reproduced by the read head.

In the light of the above teachings, various modifications and variations of the present invention are contemplated and will be apparent to those skilled in the art without departing from the spirit and scope of the invention.

What is claimed is:

1. A high density recording system for magnetically recording digital data on a record medium comprising: digital circuit means for producing high and low level signals representing individual ones of a group of successive binary digits; timing circuit means for supplying pulses at high and low repetition rates; and coding circuit means coupled to said timing and digital circuit means for selectively combining said pulses to produce a record signal including pulses at said low repetition rate having a time period defining a bit cell period wherein said pulses represent one of said binary digits and pulses at said low repetition rate and shifted in phase represent the other of said binary digits, and pulses at said high repetition rate inserted during bit cell periods for said other of said binary digits whenever adjacent binary digits are different to prevent magnetization excursions beyond uniform amplitude levels in said magnetic medium.

2. The high density recording system according to claim 1 in which said digital circuit means comprises digital storage means including means for storing at least three successive binary digits, and said coding circuit means is responsive to said high and low level signals of said digital storage means for selectively combining said pulses to produce said record signal.

3. The high density recording system according to claim 2 in which said digital storage means comprises a shift register for receiving binary digits of said digital data in serial arrangement and shifting said digital data serially in said shift register.

4. The high density recording system according to claim 1 in which said coding circuit means comprises a plurality of gating circuits individually coupled to said digital circuit means and said timing circuit means, for individually gating said pulses according to the pattern of said group of successive binary digits.

5. The high density recording system according to claim 4 in which said timing circuit means includes means for supplying timing signals defining said bit cell periods including indivdual timing signals for first and second halves respectively of each of said bit cell periods and individual gating circuits are provided for gating said pulses during said first and second halves of each of said bit cell periods.

6. The method of magnetically recording digital data on a magnetic record medium comprising: providing high and low level signals representing binary digits; producing signal level transitions between said signal levels at a predetermined low repetition rate for defining time intervals of digit cell periods and at a higher repetition rate having a wavelength substantially less than the wavelength resolution of said magnetic record medium; coding said binary digits by producing signal level transitions at said low repetition rate including a signal level transition for one of said binary digits and selectively producing a signal level transition shifted in phase for the other of said binary digits; and selectively inserting said signal level transitions at said higher rate during digit cell periods for said other binary digits whenever successive ones of said digits include said one digit.

7. The method according to claim 6 in which high and low level signals are provided for a series of at least two successive binary digits including an individual one of said binary digits being coded and the following binary digit and said signal level transition, shifted in phase is produced only when said other binary digit is immediately followed by another of said other binary digits.

References Cited

UNITED STATES PATENTS

| | | | |
|---|---|---|---|
| 3,156,871 | 11/1964 | Fraunfelder ------ | 346—74 XR |
| 3,423,744 | 1/1969 | Gerlach et al. ----- | 340—174.1 |

BERNARD KONICK, Primary Examiner

G. M. HOFFMAN, Assistant Examiner

U.S. Cl. X.R.

340—174.1